United States Patent [19]
Stein

[11] Patent Number: 5,123,178
[45] Date of Patent: Jun. 23, 1992

[54] COUNTERTOP WARMING APPARATUS

[75] Inventor: Andrew M. Stein, Massapequa Park, N.Y.

[73] Assignee: Six Corners Development Company, Amityville, N.Y.

[21] Appl. No.: 618,010

[22] Filed: Nov. 26, 1990

Related U.S. Application Data

[63] Continuation of Ser. No. 365,398, Jun. 13, 1989, abandoned, which is a continuation-in-part of Ser. No. 133,754, Dec. 16, 1987, Pat. No. 4,850,120.

[51] Int. Cl.⁵ .............................................. F26B 19/00
[52] U.S. Cl. .......................................... 34/88; 34/197; 34/233
[58] Field of Search ................ 219/391, 392, 393, 394, 219/395, 396, 400; 126/21 A, 273 R; 34/196, 197, 198, 233, 234; 219, 225, 88

[56] References Cited

U.S. PATENT DOCUMENTS

| | | | |
|---|---|---|---|
| 1,218,341 | 3/1917 | Truitt . | |
| 2,364,722 | 12/1944 | Kazantzeff | 34/196 X |
| 2,458,190 | 1/1949 | Newberger | 219/19 |
| 2,529,877 | 11/1950 | Ladge | 34/88 |
| 2,575,643 | 11/1951 | Tamsen | 34/225 |
| 3,261,650 | 7/1966 | Stromqvist | 34/196 X |
| 3,359,644 | 12/1967 | Goldman | 34/196 X |
| 4,152,842 | 5/1979 | Laughlin | 34/196 X |
| 4,307,286 | 12/1981 | Guibert | 126/21 A X |
| 4,426,923 | 1/1984 | Ohata | 99/468 |
| 4,455,478 | 6/1984 | Guibert | 34/196 X |

*Primary Examiner*—Henry Bennett
*Attorney, Agent, or Firm*—Pennie & Edmonds

[57] ABSTRACT

A free standing apparatus for warming popcorn is disclosed comprising a storage compartment having a plurality of shelves for holding food containers, a base portion housing means for providing heated air to the storage compartment and a conduit for returning the heated air from the storage compartment to the base portion for recirculation. The shelves are formed with a plurality of apertures to allow the heated air to circulate through the storage compartment within a close proximity to the food portions. The heating means is a combination of heater, diffuser and blower to circulate the heated air throughout the unit.

23 Claims, 2 Drawing Sheets

COUNTERTOP WARMING APPARATUS

CROSS REFERENCE TO RELATED APPLICATIONS

This is a continuation, of application Ser. No. 365,398, filed Jun. 13, 1989 now abandoned which is a continuation-in-part of application Ser. No. 133,754, filed Dec. 16, 1987, now U.S. Pat. No. 4,850,120.

FIELD OF THE INVENTION

The present invention relates to an improved apparatus for storing a plurality of serving portions of bulk food, such as popcorn, at a predetermined temperature until the portions are served to a customer.

BACKGROUND ART

Prior to the present invention there were available various apparatus for attempting to keep food, such as popcorn, warm. Such apparatus generally consist of a bin enclosed in a housing which was provided with heat, a glass front panel so that the customers could view the food, and a door for accessing the food in the bin. After popping, the popcorn remained in the bin until a customer requested an order, whereupon the counter attendant would open the bin door, fill a container with popcorn and serve the popcorn to the customer.

Many disadvantages of such prior art apparatus have been tolerated for years. For example, it was very time consuming for the attendant to open the bin and fill a container of popcorn for a customer. When a large number of customers are waiting to be served, this time delay would result in a loss of sales.

Popcorn warming apparatus are generally used at entertainment arenas, such as movie theaters and sports stadiums. At such entertainment arenas there are intermissions or other pauses between events during which a large crowd forms at the food counter. If the attendant wished to prefill the popcorn containers he encountered several problems. If the attendant left the filled containers on the counter top the popcorn became cold. If the attendant placed the filled containers in the bin on top of the bulk popcorn it was very unsightly for the prospective customers, the containers were susceptible to spillage as they were not a flat surface, the outside of the container usually is printed upon and thus should not contact the food directly, there was a limited amount of space in the bin for such filled containers, and it prevented a second attendant from filling more containers until the filled containers were all served.

Another disadvantage of opening and closing the bin door for each container of popcorn was that a great amount of heat was allowed to escape from the bin, thereby cooling off the popcorn and resulting in cold popcorn as well as in higher energy costs to try to maintain the desired temperature.

Further, as the attendant was hurriedly filling each container, the amounts served to each customer varied greatly. This problem leads to customer dissatisfaction and difficulty in keeping inventory at a proper level.

Yet another disadvantage of the prior art apparatus was that the warm popcorn was served in cold containers, thus causing the popcorn to rapidly cool to a less palatable state than if it would be kept at or near its popping temperature.

Accordingly, the present invention provides a simple solution to these problems in a heretofore unknown manner, so as to improve the efficiency of serving popcorn as well as to improve palatability of the popped corn itself.

SUMMARY OF THE INVENTION

The present invention relates to an improved apparatus for storing food, such as popcorn, and keeping the food warm prior to being served to a customer. The popcorn warming apparatus of the present invention is a free standing unit which includes a storage compartment, means for providing heated air to the storage compartment, and means for storing, displaying and accessing individualized serving portions of food. The storage compartment includes an upper portion having a plurality of adjustable trays or shelves onto which the filled containers are placed, means for viewing and accessing these containers and a lower portion which houses the heating means. The viewing means for the storage compartment can be a transparent member made of plastic or glass. Alternatively, the front and rear panel as well as the side panels of the storage compartment may all be made of transparent plastic or glass to allow viewing of the food portions therein from all sides. In addition, at least one of the panels is slideably, hingeably or moveably mounted to the storage compartment to provide access to the food portions.

The flat trays or shelves are preferably either less wide or less deep than the interior of the storage compartment so as to allow hot air to circulate. Alternately, the shelves may be provided with apertures to let the hot air pass therethrough. The heating means of the present invention may either be located in the upper portion of the compartment or, in the lower portion, or in any combination of the aforementioned, and may include an air circulating means, such as a blower. The heating means generally includes one or two conduits for returning heated air from the upper portion to the lower portion. Preferably, the circulating means is located within the conduit.

The unit is rendered free standing in that it is completely self-contained and requires no additional input from a periphery apparatus to achieve the heating, displaying and storing functions described herein. In addition, the bottom surface of the lower portion is substantially flat and may have support means, such as legs, so that the unit may rest on any substantially flat surface, such as the floor or a countertop.

The apparatus of the present invention greatly facilitates the fast, efficient serving of warm food, such as popcorn, by a food counter attendant, particularly during busy periods. Also, a food counter attendant can effectively serve popcorn which is warmer than the popcorn served from the prior art apparatus in that the popcorn container is also warm and less heat escapes from the popcorn bin during the serving of the popcorn. Thus, the need for a food counter attendant to store filled popcorn containers on top of the bulk popcorn in the popcorn bin is eliminated, and the energy consumption used for heating popcorn is reduced in that the popcorn bin need not be opened as frequently and the total time which the popcorn bin is open is reduced.

Yet another advantage of the present invention is to allow a food counter attendant to fill large numbers of pop-corn containers during periods when there are no customers, thereby allowing the attendant to be less hurried and more methodical resulting in evenly filled popcorn containers. Thus, the present invention provides an improvement upon the popcorn warming apparatus disclosed in the inventor's U.S. patent application Ser. No. 4,850,120, the content of which is expressly incorporated herein by reference thereto. These improvements include the ability to move the unit from station to station as need requires, and a cost, space and energy efficient free-standing unit for storing, displaying and warming individualized portions of food as an independent unit which can be used to supplement existing machines.

BRIEF DESCRIPTION OF THE DRAWINGS

Further benefits and advantages of the invention will become apparent from a consideration of the following description given with reference to the accompanying drawing figures which specify and show preferred embodiments of the invention and wherein.

DETAILED DESCRIPTION OF THE PREFERRED EMBODIMENTS

In the description that follows, reference is made to attached drawing figures. For information on alternate embodiments, the inventor's prior U.S. patent application Ser. No. 4,850,120 may be reviewed.

Figure 1:
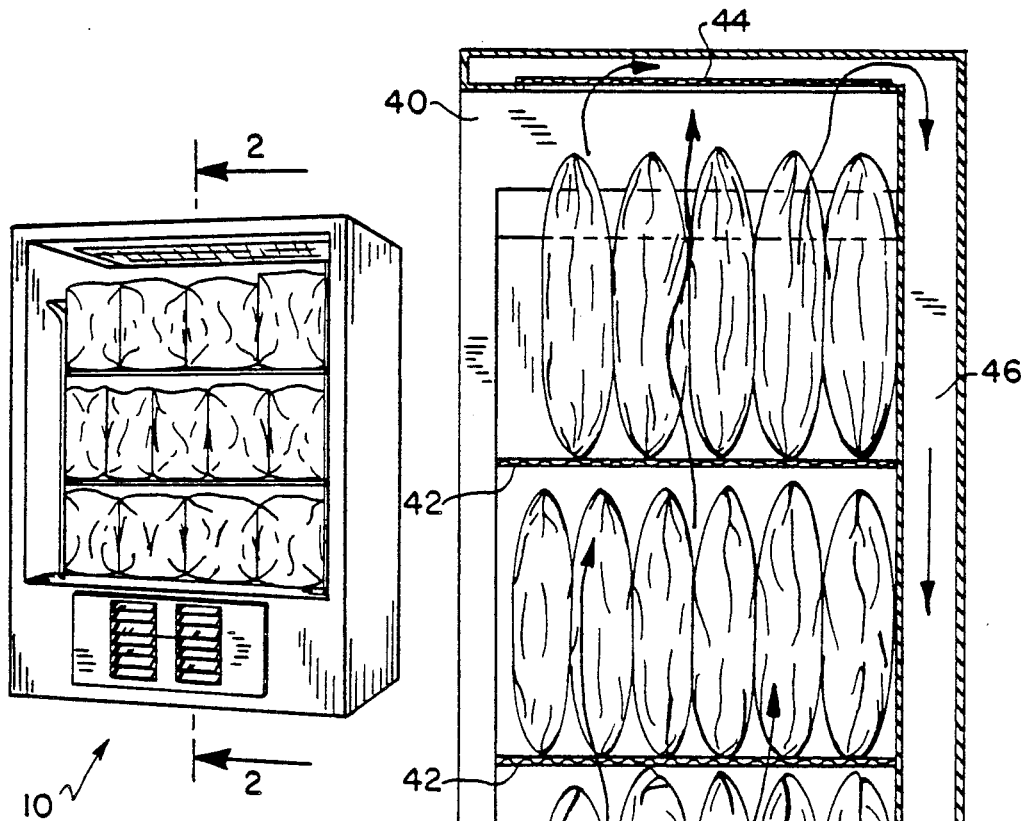
FIG. 1 is a perspective view of a popcorn warming apparatus according to the invention.
Figure 2:
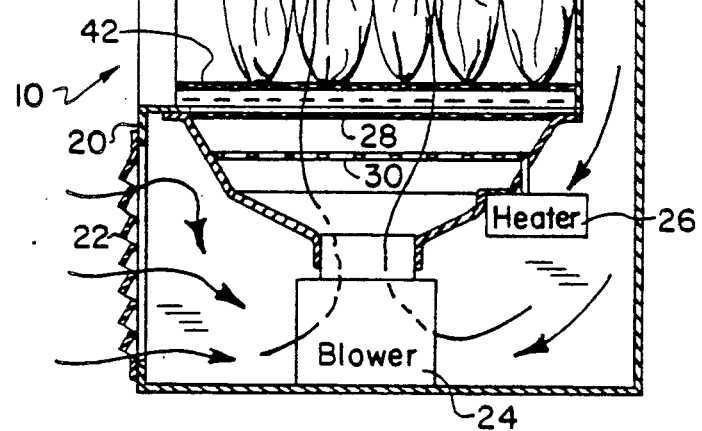
FIG. 2 is a cross-sectional view of the apparatus of FIG. 1 taken along lines 2—2.

Referring now to FIGS. 1 and 2, there is illustrated a popcorn warming apparatus 10 according to the invention. This apparatus houses two separate sections in a single freestanding unit: a storage compartment 40 for holding individualized serving portions of food; and a base compartment 20 for housing the electrical components.

Apparatus 10 is rendered free standing by base compartment 20 which supports the unit and enables apparatus 10 to remain upright when placed on a substantially flat surface. Apparatus 10 is placed on any substantially flat surface convenient to an existing food producing machine for ease of access by the counter person or operator.

A food such as popped corn in serving portion containers is maintained at a predetermined temperature in storage compartment 40. The popping means may be located in an independent adjacent apparatus, whereby the corn can be popped and held before being introduced into warming apparatus 10. In addition, empty popcorn containers, i.e., bags or cups, may be warmed in storage compartment 40.

Storage compartment 40 is warmed by introducing heated air through a perforated tray or shelf 28 by heater 26, the end of which includes a diffuser or other air distributing means 30. The air is warmed by an inline heater 26 located downstream of diffuser 30. Heater 26 includes a plurality of wires or heating coils through which electrical current passes, thus causing the wires to heat and warm the air in a manner well known to those skilled in the art. Air is forced through heater 26 and diffuser 30 by blower 24. Blower 24 and heater 26 are conveniently located in base compartment 20, which also includes inlet vent 22 for cooling of the electrical components.

For convenience in tailoring the operation of the unit to the demands of food service, heater 26 may be of the type that can provide different levels of the heat, such levels being selectable by a control means located on the exterior of apparatus 10. Thus, when initially turning on the unit, a higher heat level can be used to quickly warm storage compartment 40. After the desired temperature is reached, the heating level can be automatically or manually reduced to a lower value.

This heating control can also be utilized with a thermostat for intermittently operating heater 26 and blower 24. This enables energy conservation in that heater 26 and blower 24 do not have to be continuously operated, and the heating control can be designed to automatically achieve the higher heating level when the blower is operating so as to further reduce the time of operation of blower 24. The thermostat also enables heat to be quickly returned to the storage compartment when the access doors have been opened, such as after food portions have been placed therein or removed therefrom by the operator.

An upper portion of base compartment 20 forms a lower portion of storage compartment 40. As shown in FIG. 2, a common wall 28 is provided between these sections. In order to allow heated air to be introduced into storage compartment 40 from heater 26, a plurality of vents in the form of holes are provided in wall 28. Preferably, this wall may be a perforated metal plate or screen. Warm air thus enters storage compartment 40 for warming the individual food containers.

Although the FIGS. 1 and 2 each show containers filled with popcorn, it is possible to use part or all of storage compartment 40 to hold empty popcorn containers or bags, thus also heating them to the desired temperature. By this procedure, an operator can then fill the warmed empty containers with the warmed popcorn and thereafter place the filled containers back into the storage compartment 40. Thus, a number of containers can be filled in this manner and maintained heated and ready for dispensing to a customer.

The filled containers are preferably maintained on shelves 42 which are adjustably mounted to storage compartment 40 to accommodate a wide range of container sizes. Heated air is allowed to circulate through storage compartment 40 by providing space between the end of shelves 42 and the walls. Alternately, shelves of a perforated material, such as wire shelving, or shelves having apertures or vents which allow air circulation therethrough can also be used.

As the heated air circulates through apparatus 10, it generally tends to rise. Thus, heated air collects at the upper portion of storage compartment 40. For optimum efficiency in utilizing the heated air, return line 46 is installed. Heated air from storage compartment 40 passing through perforated wall 44 at the top of compartment 40 enters return line 46 to be recirculated to blower 24 and through heater 26 back into compartment 40. In addition, the ambient air supplied by inlet vent 22 is permitted to flow into blower 24 thereby mixing with the heated air to provide fresh air to storage compartment 40.

Figure 4:
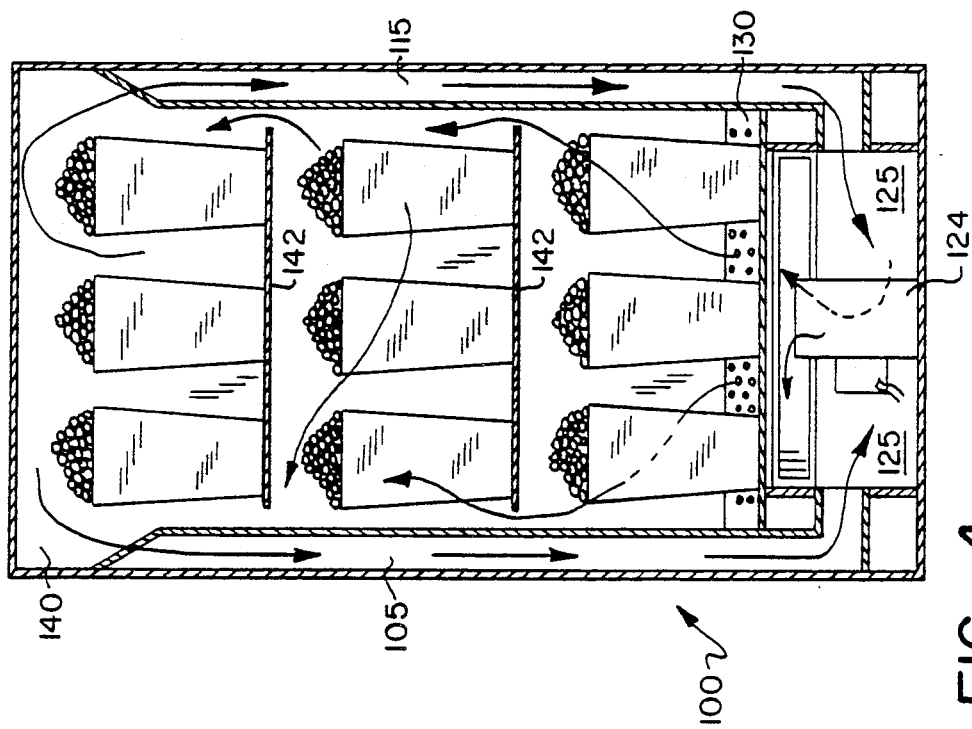
FIG. 4 is a cross sectional view of the apparatus of FIG. 3 taken along lines 4—4.
Figure 3:
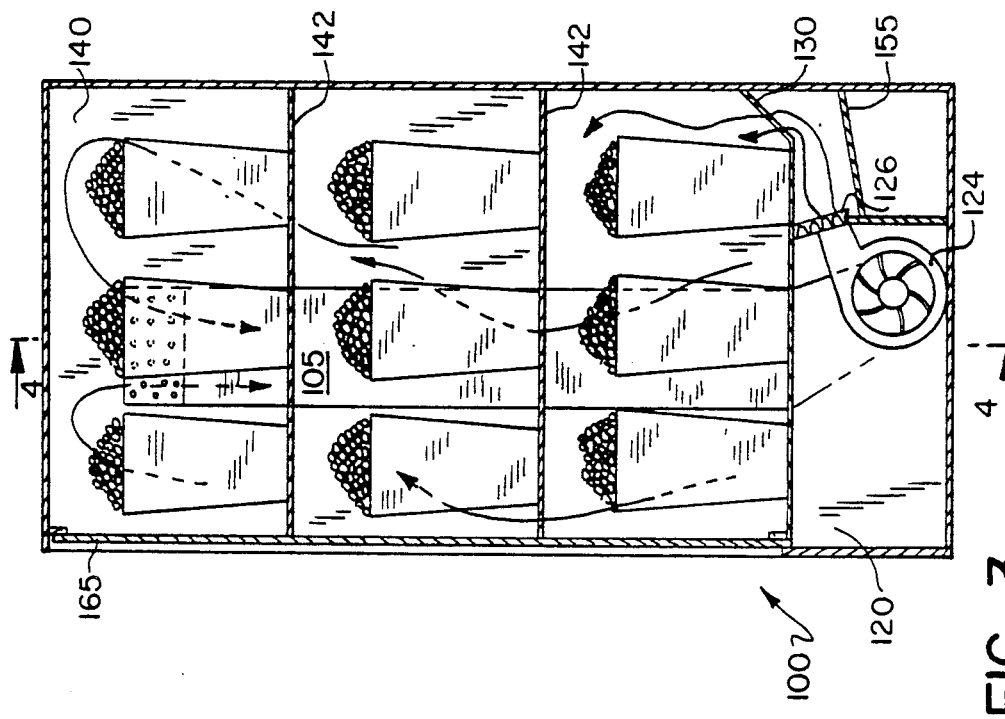
FIG. 3 is a front view of an alternate embodiment of the apparatus of the invention.

FIGS. 3 and 4 illustrate another emobodiment of the invention. For the popcorn warming apparatus 100 of this embodiment, component parts which are the same as the apparatus of FIGS. 1 and 2 carry the same numerical designation, but have 100 added thereto.

In FIGS. 3 and 4, a pair of return conduit 105, 115 are placed on opposed inner sidewalls of the upper compartment. These conduit extend from an upper portion of the storage compartment 140 to the base compartment 120, where the conduits converge into a common duct 125 which leads to blower 124. Recirculated air exiting blower 124 passes by heating element 126 before entering storage compartment 140 through diffuser 130. The conduits 105, 115 include an apertured or screen portion 135, 145 at their upper ends to facilitate entry of air for recirculation by the blower 124.

A chamber downstream of the blower includes the heating element 126 and is designed with the appropriate baffles 155, so that heated air passing therethrough, in combination with diffuser 130, properly circulates within storage compartment 140 for warming all areas therein.

Access to storage compartment 140 is provided by doors 165, preferably of the side-sliding type for quick access with minimum heat loss when retrieving the filled containers of popped corn. Other door designs, such as hinge or spring type, are possible to reduce or minimize heat loss when opening and closing. If desired, doors 165 of storage compartment 140 can be made of glass, metal, wood or other suitable materials. Storage compartment access doors 165 are preferably made of transparent acrylic so the operator can easily view how many serving portions are on hand for distribution to customers. In another embodiment the side panels of the apparatus, as well as the rear panel, can all be made of a transparent material so that the food portions may be viewed from all angles.

In an alternate embodiment of the invention, the heating unit may be an electric heater mounted on an inner wall of the storage compartment. There is no need for an inline heater, and the blower can force air directly into the storage compartment. Again, a return conduit is used to return heated air from the top of the storage compartment to the blower, thus reducing the demand on the time of use of the electric heater.

The appropriate electronic wiring and controls are not shown since they are well known to one skilled in the art. The apparatus may be adapted for connection to an AC outlet, or it may be hard wired for more permanent installations.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. An apparatus for storing, displaying and warming food to be served to a customer, comprising:
    a storage compartment for holding food portions to be served to a customer or food containers for said food portions at a predetermined temperature above room temperature and including means for displaying the interior of said storage compartment, and means for accessing said food portions or containers, said accessing means formed of at least one transparent member movable between a closed position and an open position for providing access to said displayed food portions or containers;
    means for providing heated air for warming said storage compartment;
    a plurality of shelves in said storage compartment including means for allowing heated air to travel through said storage compartment from a lower portion to an upper portion thereof; and
    at least one conduit for returning heated air from said upper portion to said lower portion of said storage compartment to completely recirculate said heated air.

2. The apparatus of claim 1 wherein said shelves each include a plurality of apertures for enabling heated air to pass therethrough.

3. The apparatus of claim 1 wherein said means for providing heated air is located upon an inside wall of said lower portion of said storage compartment.

4. The apparatus of claim 1 wherein said at least one conduit contains blower means for circulating said heated air from said upper portion to said lower portion.

5. The apparatus of claim 1 wherein said conduit further contains said means for providing heated air, wherein all air in said conduit must pass through said heating means.

6. The apparatus of claim 1 wherein at least two return conduits are provided, one each on opposite inner side walls of the storage compartment.

7. The apparatus of claim 1 further comprising means to provide a free standing unit so that said apparatus may be placed upon a substantially flat surface.

8. The apparatus of claim 1 wherein the viewing means includes a transparent member which is capable of sliding engagement with a structural member of said apparatus between closed and open positions to provide access to said food portions or containers.

9. The apparatus of claim 1 wherein said viewing means includes a transparent member having means for pivoting about one side thereof between closed and open positions so as to provide access to said food portions or containers.

10. An apparatus for storing, displaying and warming food to be served to a customer, comprising:
    a storage compartment for holding food portions to be served to a customer or food containers for said food portions at predetermined temperature above room temperature and including means for displaying the interior of the storage compartment, and means for accessing said food portions or containers, said accessing means formed of at least one transparent display member movable between a closed position and open position for providing access to said displayed food portions or containers;
    means for providing heated air for warming said storage compartment;
    a plurality of shelves in said storage compartment including means for allowing heated air to travel through said storage compartment from a lower portion of an upper portion thereof;
    means for returning heated air from said upper portion to said lower portion of said storage compartment to completely recirculate said heated air; and
    a base compartment for supporting said storage compartment and which enables said apparatus to remain upright and free standing when placed upon a substantially flat surface.

11. The apparatus of claim 10 wherein said shelves each include a plurality of apertures for enabling heated air to pass therethrough.

12. The apparatus of claim 10 wherein said means for providing heated air is located upon a wall of said lower portion of said storage compartment.

13. The apparatus of claim 10 wherein aid conduit contains blower means for circulating said heated air from said upper portion to said lower portion, and wherein said blower means is located in said base compartment.

14. The apparatus of claim 10 wherein said conduit further contains said means for providing heated air, wherein all air in said conduit must pass through said heating means.

15. An apparatus for storing, displaying and warming food to be served to a customer, comprising:
- a storage compartment for holding food portions to be served to a customer or food containers for said food portions at a predetermined temperature above room temperature and including at least one transparent display member movable between a closed position and an open position for displaying and accessing said food portions or containers;
- means for providing heated air for warming said storage compartment;
- a plurality of shelves in said storage compartment including means for allowing heated air to travel through said storage compartment from a lower portion to an upper portion thereof;
- a base compartment for supporting said storage compartment and which enables said apparatus to remain upright and free standing when placed on a substantially flat surface; and
- at least two conduits for returning heated air from said upper portion to said lower portion of said storage compartment, one located on each opposite inside wall of said storage component, said conduits forming a common duct in said base compartment, which duct includes blower means therein to completely recirculate said heated air.

16. The apparatus of claim 15 wherein said shelves each include a plurality of apertures for enabling heated air to pass therethrough.

17. The apparatus of claim 15 wherein the transparent member is capable of sliding engagement with a structural member of said apparatus between closed and open positions to provide access to said food portions or containers.

18. The apparatus of claim 15 wherein said transparent member includes means for pivoting about one side thereof between closed and open positions so as to provide access to said food portions or containers.

19. The apparatus of claim 15 wherein said means for providing heated air is located upon an inside wall of said lower portion of said storage compartment.

20. The apparatus of claim 15 wherein said air heating means is located adjacent the output of said blower means.

21. An apparatus for storing, displaying and warming food to be served to a customer, consisting essentially of:
- a storage compartment for holding food portions to be served to a customer or food containers for said food portions at a predetermined temperature above room temperature and including means for displaying the interior of the storage compartment, and means for accessing said food portions or containers, said accessing means formed of at least one transparent display member movable between a closed position and an open position for providing access to said displayed food portions or containers with substantially all of the interior of said storage compartment being displayed and accessible;
- means for providing heated air for warming said storage compartment;
- a plurality of shelves in said storage compartment including means for allowing heated air to travel through said storage compartment from a lower portion to an upper portion thereof;
- a base compartment for supporting said storage compartment and which enables said apparatus to remain upright and free standing when placed on a substantially flat surface; and
- at least one conduit for returning heated air from said upper portion to said lower portion of said storage compartment, said conduit extending into said base compartment where blower means are included therein associated with said conduit for complete recirculation of said heated air.

22. The apparatus of claim 21 wherein at least two conduits are provided for recirculating heated air, said conduits located on opposite inside walls of storage compartment and forming a common duct in said base compartment, said duct including said blower means.

23. The apparatus of claim 22 wherein said shelves each include a plurality of apertures therein for enabling heated air to pass therethrough.

* * * * *